US006993323B2

(12) United States Patent
Kamma (10) Patent No.: US 6,993,323 B2
(45) Date of Patent: Jan. 31, 2006

(54) WIRELESS COMMUNICATION PROCESSING SYSTEM, WIRELESS COMMUNICATION PROCESSING DEVICE, AND WIRELESS COMMUNICATION PROCESSING METHOD

(75) Inventor: Hiroshi Kamma, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 308 days.

(21) Appl. No.: 10/633,313

(22) Filed: Aug. 4, 2003

(65) Prior Publication Data
US 2004/0067736 A1  Apr. 8, 2004

(30) Foreign Application Priority Data
Aug. 5, 2002  (JP) .............................. 2002-227532

(51) Int. Cl.
*H04M 3/16* (2006.01)
(52) U.S. Cl. ................... 455/411; 455/410; 455/412.1; 340/546; 379/102.03
(58) Field of Classification Search ............... 455/411, 455/410, 412.1; 379/102.03; 340/546
See application file for complete search history.

(56) References Cited

U.S. PATENT DOCUMENTS

| 6,693,999 B2 * | 2/2004 | Ito et al. ................. 379/102.03 |
| 2002/0169002 A1 * | 11/2002 | Imbrie et al. ................ 455/557 |
| 2004/0029568 A1 * | 2/2004 | DeLuca et al. ........... 455/412.1 |
| 2004/0097217 A1 * | 5/2004 | McClain ..................... 455/411 |
| 2004/0113778 A1 * | 6/2004 | Script et al. ............. 340/545.1 |
| 2004/0242201 A1 * | 12/2004 | Sasakura et al. ............ 455/411 |

* cited by examiner

*Primary Examiner*—Danh Cong Le
(74) *Attorney, Agent, or Firm*—McDermott Will & Emery LLP

(57) ABSTRACT

A wireless communication processing system for performing wireless communication processing operation between a plurality of apparatuses includes a first wireless communication processing device provided to first one of the plurality of apparatuses and having a first unique ID, and a second wireless communication processing device provided to second one of the plurality of apparatuses and having a second unique ID, in which in response to a connection request issued from a third wireless communication processing device to the first wireless communication processing device, the first wireless communication processing device transmits the unique ID of the third wireless communication processing device as a third unique ID to the second wireless communication processing device.

8 Claims, 7 Drawing Sheets

WIRELESS COMMUNICATION PROCESSING SYSTEM, WIRELESS COMMUNICATION PROCESSING DEVICE, AND WIRELESS COMMUNICATION PROCESSING METHOD

BACKGROUND OF THE INVENTION

The present invention relates to a wireless communication processing technique for performing wireless communication processing operation between a plurality of apparatuses.

In wireless communication such as wireless LAN or Bluetooth, since connection between apparatuses unlike wired communication cannot be seen to the user, it is difficult for the user to detect an unauthorized connection by a cracker. For the purpose of preventing such an unauthorized connection, authentication based on passkey is used. In Bluetooth, for example, authentication called pairing is used so that, upon connection, an identical passkey is input from two communicating apparatuses to form a mutually relied relationship. An input/output means for the user to enter and confirm the display of the passkey is not provided in the wireless communication apparatuses from the viewpoint of preventing increase of cost and mounting area, but the passkey is previously set in another external device, so that, upon connection, authentication using the passkey can be automatically carried out under control of a program.

In the above technique, when authentication is automatically carried out under control of the program of the wireless communication apparatuses and even when a cracker tries many times to obtain the authentication from an unauthorized apparatus, the user cannot notice it in most cases. To avoid this, it is an effective measure, for example, to automatically refuse the connection from the same apparatus when the apparatus ends in failure of the authentication by a preset number of times or more. Even in this case, however, since a communication range is limited in a network based on wireless LAN or Bluetooth, it is still possible for a cracker or unauthorized apparatus to try unauthorized connection to an apparatus other than the connection-rejected apparatus in the same network. For this reason, the above is also considered not to be a sufficiently effective measure of preventing the unauthorized access.

SUMMARY OF THE INVENTION

In view of the above technique situations, it is an object of the present invention to provide a wireless communication processing technique which can solve the above problems, that is, which can prevent a cracker or unauthorized apparatus from invading a wireless network and can offer high security.

In accordance with an aspect of the present invention, the above object can be attained, when a connection request is issued from an apparatus located outside of a network having a plurality of apparatuses connected therein to ask a connection permission but its authentication ends in a failure, basically by transmitting the unique ID of the apparatus outside of the network to some or all of the plurality of apparatuses in the network as the unique ID of the authentication-failure or unauthorized apparatus to be commonly recognized thereby. Further, when the connection request is issued from the apparatus outside the network, the presence of the connection request is displayed or informed on or to at least any of the plurality of apparatuses in the network. More specifically, (1) a wireless communication processing system for performing wireless communication processing operation between a plurality of apparatuses includes a first wireless communication processing device (e.g., reference numeral 15a in this embodiment) having a first unique ID and provided to first one (e.g., reference numeral 10 in the present embodiment) of the above plurality of apparatuses as well as second wireless communication processing devices (e.g., reference numerals 15b, 15c and 15d in this embodiment) having second unique ID's and provided to second ones (e.g., reference numerals 11, 12 and 13 in the present embodiment) of the above plurality of apparatuses. The system is arranged so that, when a connection request is issued from a third wireless communication processing device (reference numeral 15e in the embodiment) provided to an apparatus (reference numeral 14 in the present embodiment) other than the above plurality of apparatuses to the first wireless communication processing device (e.g., reference numeral 15a), and when the first wireless communication processing device once allows the connection but ends in a failure of its authentication; the first wireless communication wireless communication processing device transmits a third unique ID as the unique ID of the third wireless communication processing device to the second wireless communication processing devices (e.g., reference numerals 15b, 15c and 15d in the embodiment) as an authentication-failure unique ID or unauthorized apparatus unique ID. And when the second wireless communication processing device receives the third unique ID and receives a connection request from the third wireless communication processing device, the second device refuses the connection. (2) Similarly, a wireless communication processing system includes a first wireless communication processing device (e.g., reference numeral 70a in this embodiment) having a first unique ID and provided to first one (e.g., reference numeral 10 in the present embodiment) of the above plurality of apparatuses as well as second wireless communication processing devices (e.g., reference numerals 70b, 70c and 70d in this embodiment) having second unique ID's provided to second ones (e.g., reference numerals 11, 12 and 13 in the present embodiment) of the above plurality of apparatuses. The system is arranged so that, when a connection request is issued from a third wireless communication processing device (reference numeral 70e in the embodiment) provided to an apparatus (reference numeral 14 in the present embodiment) other than the above plurality of apparatuses to the first wireless communication processing device, the first wireless communication processing device (e.g., 70a in the embodiment) transmits a third unique ID as the unique ID of the third wireless communication processing device (reference 70e in the embodiment) to the second wireless communication processing devices (e.g., reference numerals 70b, 70c and 70d in the embodiment) as a connection request unique ID. And the second wireless communication processing devices receive the third unique ID and display the presence of the connection request from the third wireless communication processing device or inform of the presence, and also transmit connection acknowledge/negative-acknowledge information to the first wireless communication processing device; meanwhile, the first wireless communication processing device receives the connection acknowledge/negative-acknowledge information and transmits it to the third wireless communication processing device. (3) Further, a wireless communication processing device for performing wireless communication processing operation between a plurality of apparatuses includes a wireless communication unit (reference numerals 200, 200a, 200b, 200c and 200d) provided respectively to the plurality of apparatuses (reference numerals 10, 11, 12 and 13 in the present embodiment) and capable of transmitting and receiving their unique ID's; a memory unit (reference numerals 202, 202a, 202b, 202c and 202d) in the embodiment) capable of storing therein the received unique ID and authenticating passkey; and a control unit (reference numerals 203, 203a, 203b, 203c and 203d in the embodiment), when issuing a connection acknowledge on the basis of the connection request information received at the wireless a communication unit from the apparatus (reference numeral 14 in this embodiment) other than the above plurality of apparatuses and then ending in a failure of its authentication, for controllably transmitting the unique ID of the apparatus other than the plurality of apparatuses to other ones of the plurality of apparatuses in the network as an authentication-failure unique ID or unauthorized-apparatus unique ID. (4) Further, a wireless communication processing device includes the wireless communication unit (reference numerals 200, 200a, 200b, 200c and 200d) provided respectively to the plurality of apparatuses (reference numerals 10, 11, 12 and 13 in the present embodiment) and capable of transmitting and receiving their unique ID's; the memory unit (reference numerals 202, 202a, 202b, 202c and 202d) in the embodiment) capable of storing therein the received unique ID and authenticating passkey; and the control unit (reference numerals 203, 203a, 203b, 203c and 203d in the embodiment), when issuing a connection acknowledge on the basis of the connection request information received at the wireless communication unit from the apparatus other than the above plurality of apparatuses and then ending in a failure of its authentication, for controllably transmitting the unique ID of the apparatus other than the plurality of apparatuses to the other ones of the plurality of apparatuses in the network as an authentication-failure unique ID or unauthorized-apparatus unique ID and, when receiving the transmitted unique ID, for controllably rejecting the connection with the apparatus other than the plurality of apparatuses of the network. (5) Further, a wireless communication processing device includes the wireless communication unit (reference numerals 200, 200a, 200b, 200c and 200d) provided respectively to the plurality of apparatuses (reference numerals 10, 11, 12 and 13 in the present embodiment) and capable of transmitting and receiving their unique ID's; the memory unit (reference numerals 202, 202a, 202b, 202c and 202d) in the embodiment) capable of storing therein the received unique ID and authenticating passkey; and the control unit (reference numerals 203, 203a, 203b, 203c and 203d in the embodiment), when the above wireless communication unit receives the connection request information from the apparatus other than the plurality of apparatuses, for controllably transmitting the unique ID of the apparatus other than the plurality of apparatuses to other ones of the plurality of apparatuses in the network as a connection request unique ID. (6) In the above wireless communication processing device as set forth in the above Item (3) or (4), the above control unit is arranged so as to store the frequency of the above authentication failure in the memory unit and when the authentication failure frequency reached a predetermined value, to transmit the unique ID of the apparatus (reference numeral 14 in this embodiment) other than the plurality of apparatuses to other ones of the plurality of apparatuses of the network as an authentication failure unique ID or unauthorized apparatus unique ID. (7) A wireless communication processing device for performing wireless communication processing operation between a plurality of apparatuses includes the wireless communication unit (reference numerals 200, 200a, 200b, 200c and 200d) provided respectively to the plurality of apparatuses (reference numerals 10, 11, 12 and 13 in the present embodiment) and capable of transmitting and receiving their unique ID's; the memory unit (reference numerals 202, 202a, 202b, 202c and 202d) in the embodiment) capable of storing therein the received unique ID and authenticating passkey; and the control unit (reference numerals 203, 203a, 203b, 203c and 203d in the embodiment), when issuing a connection acknowledge on the basis of the connection request information received at the wireless communication unit from the apparatus other than the above plurality of apparatuses and then ending in a success of its authentication, for controllably storing the unique ID of the apparatus other than the plurality of apparatuses in the memory unit as a connection acknowledge unique ID. (8) Each apparatus is provided with such a wireless communication processing device as mentioned in the above Items (3) to (7). (9) A wireless communication processing method for performing wireless communication processing operation between a plurality of apparatuses includes the steps of storing a received unique ID and an authenticating passkey; issuing a connection acknowledge on the basis of connection request information from an apparatus other than a plurality of apparatuses in a network; transmitting, when issuing the connection acknowledge and then ending in a failure of its authentication, the unique ID of the apparatus other than the plurality of apparatuses to other ones of the plurality of apparatuses in the network as an authentication-failure unique ID or unauthorized-apparatus unique ID; and receiving the transmitted unique ID to reject the connection with the apparatus other than the plurality of apparatuses of the network. (10) Similarly, a wireless communication processing method includes the steps of storing a received unique ID and an authenticating passkey; receiving connection request information from an apparatus other than a plurality of apparatuses in a network and transmitting the unique ID of the apparatus other than the plurality of apparatuses in the network to other ones of the plurality of apparatuses of the network as a connection request unique ID; receiving the transmitted connection request unique ID to display the presence of the connection request or inform of it and also transmitting connection acknowledge information or connection rejection information to the apparatus other than the plurality of apparatuses of the network.

Other objects, features and advantages of the invention will become apparent from the following description of the embodiments of the invention taken in conjunction with the accompanying drawings.

DESCRIPTION OF THE EMBODIMENTS

The present invention will be explained in connection with embodiments of the present invention with reference to the attached drawings.

FIGS. 1 to 5 show a first embodiment of the present invention.

Figure 1:
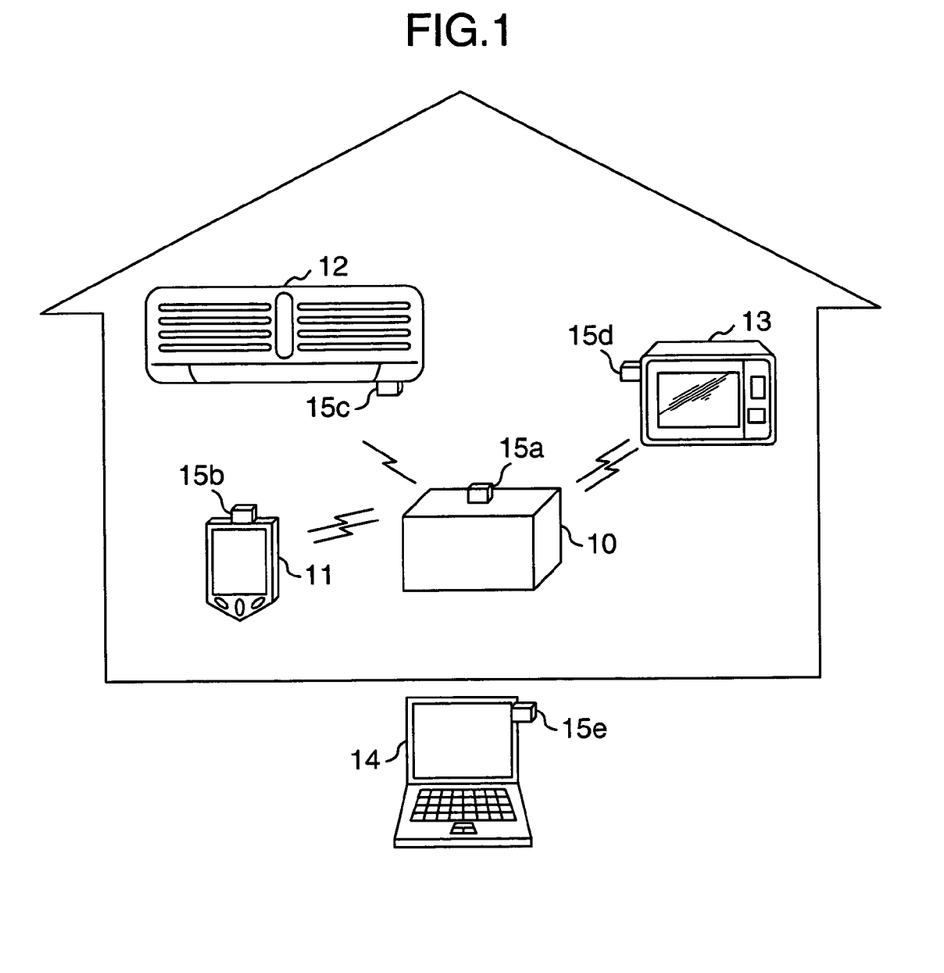
FIG. 1 is a configuration of a wireless communication processing system in accordance with a first embodiment of the present invention.
Figure 3:
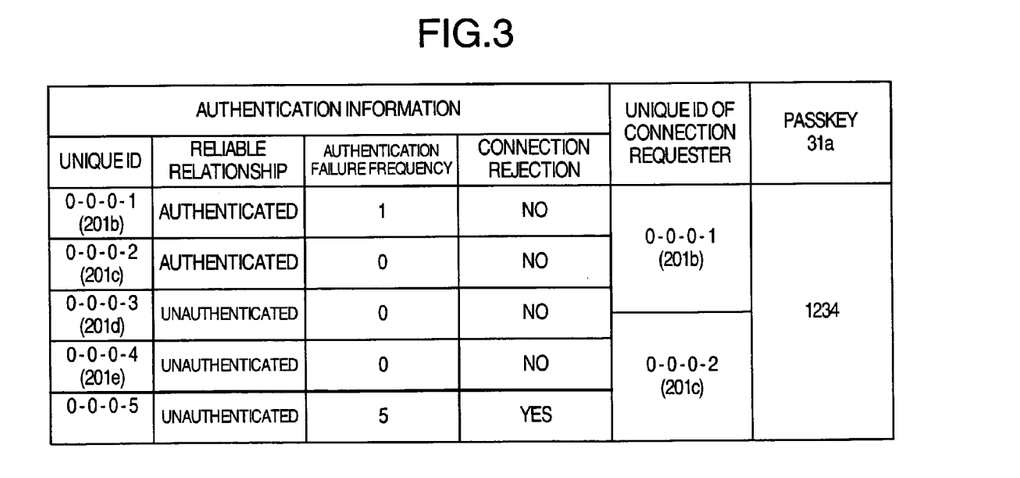
FIG. 3 shows an example of information stored in a memory of the wireless communication processing device of FIG. 2.
Figure 4:
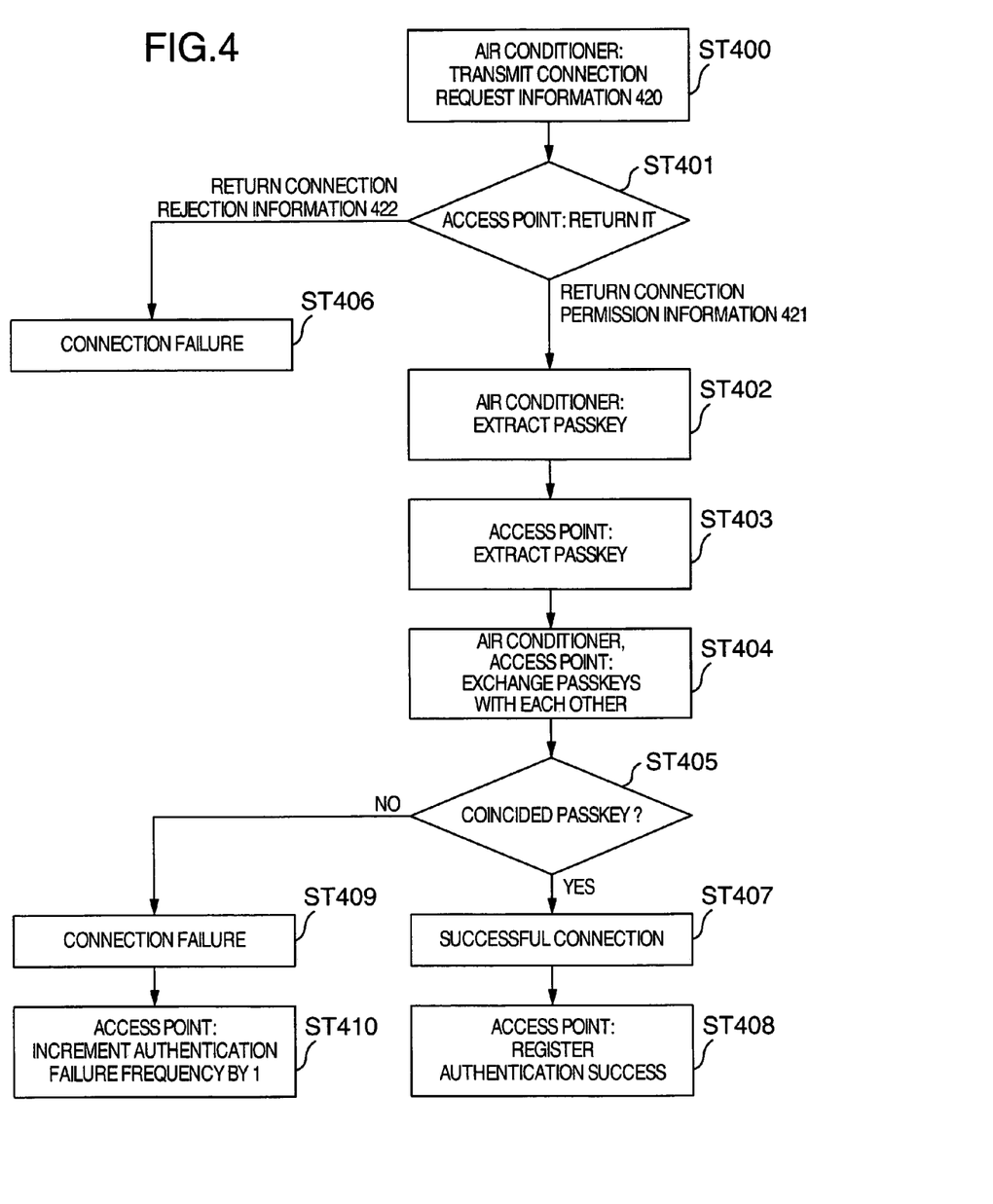
FIG. 4 is a flow chart showing an exemplary procedure when wireless connection is established with the configuration of FIG. 1.
Figure 5:
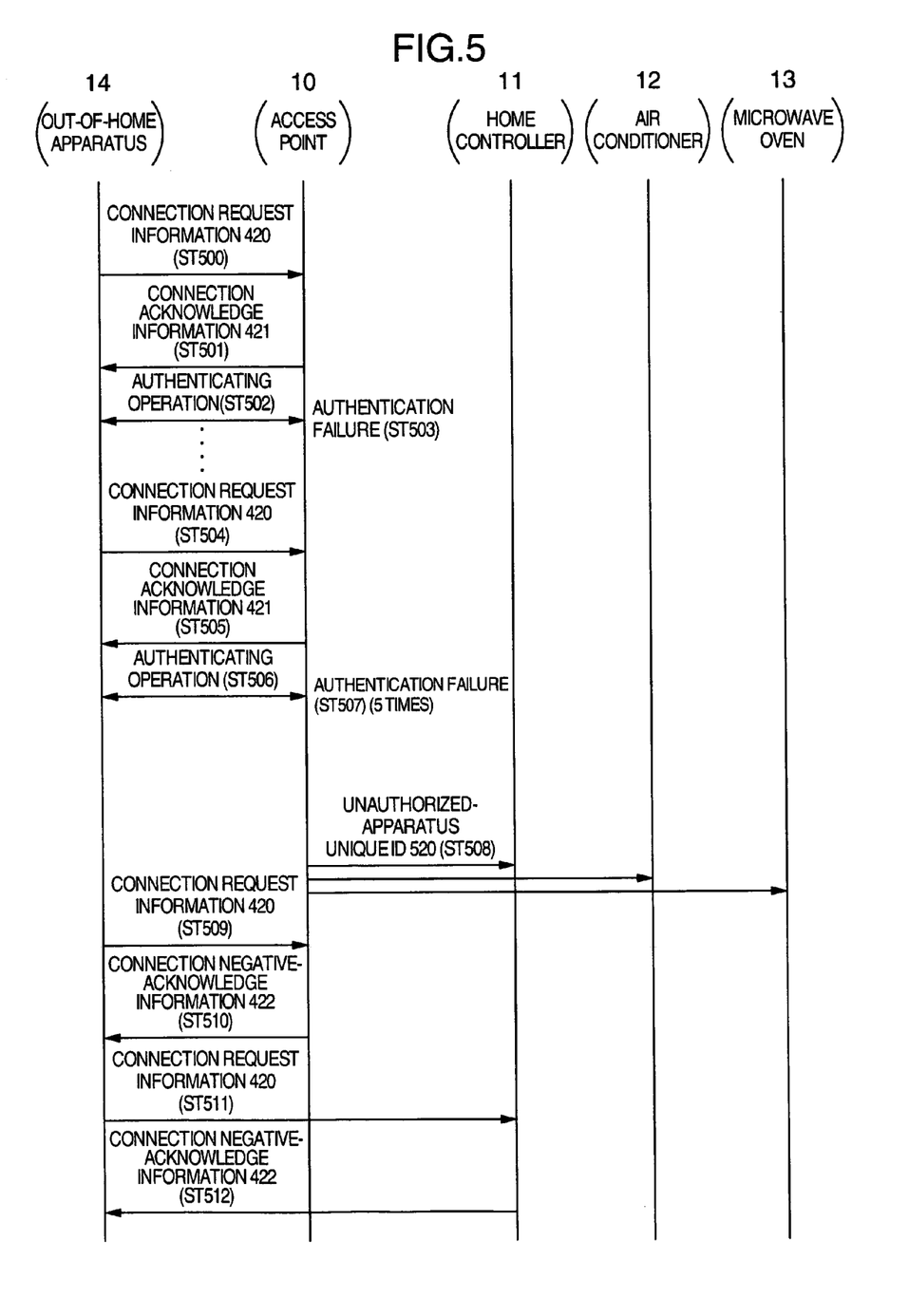
FIG. 5 shows flows of exemplary procedure when a connection to an out-of-home apparatus which failed in authentication with the configuration of FIG. 1 was rejected.

The present embodiment shows an example of a wireless communication processing system when domestic appliances in a home make up a wireless home network and when an unauthorized apparatus located outside of the home tries to invade the wireless home network. FIG. 1 is an exemplary configuration of a wireless communication processing system in which domestic appliances are connected in a wireless network, FIG. 2 is an exemplary structure of a wireless communication processing device, FIG. 3 shows an example of information stored in a memory unit of the wireless communication processing device, FIG. 4 shows a flow chart for explaining an exemplary procedure when wireless connection is established in a home, and FIG. 5 shows flows of an exemplary procedure when a connection to an apparatus located outside of the home is rejected.

In FIG. 1, reference numeral 10 denotes an access point for the domestic appliances to be connected through the wireless network, numeral 11 denotes a home controller for controlling the domestic appliances in the home through the wireless network within the home, 12 denotes an air conditioner as one of the domestic appliances in the home, 13 denotes a microwave oven, 15a denotes a wireless communication processing device provided to the access point 10, 15b denotes a wireless communication processing device provided to the home controller 11, 15c denotes a wireless communication processing device provided to the air conditioner 12, and 15d denotes a wireless communication processing device provided to the microwave oven 13. The access point 10, home controller 11, air conditioner 12 and microwave oven 13 are connected by means of the wireless communication processing devices 15a, 15b, 15c and 15d provided thereto in the form of a wireless network. More specifically, the home controller 11, air conditioner 12 and microwave oven 13 are connected by means of the access point 10 in the form of the wireless network, so that the air conditioner 12 and microwave oven 13 are controlled by operating the home controller 11. In the present embodiment, the home controller 11, air conditioner 12 and microwave oven 13 form in-home appliances. Reference numeral 14 denotes an out-of-home apparatus which tries to invade the wireless network in the home, and numeral 15e denotes a wireless communication processing device provided to the out-of-home apparatus 14.

Figure 2:
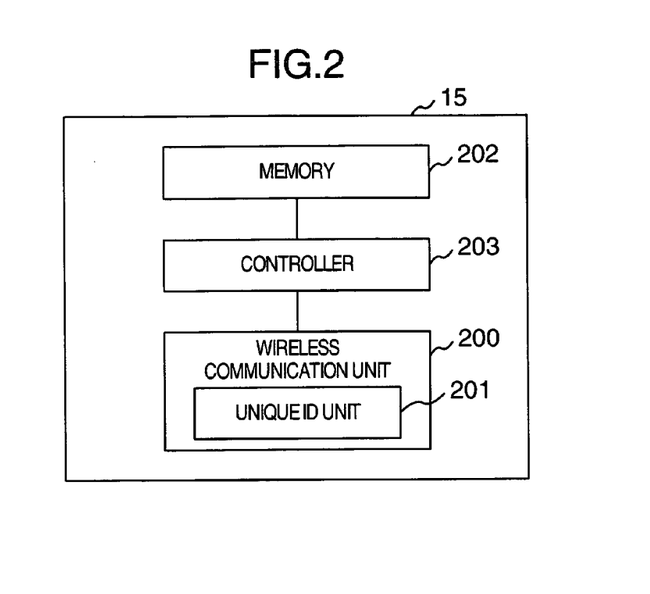
FIG. 2 is a structure of the wireless communication processing device in FIG. 1.

FIG. 2 shows an exemplary internal structure of each of the wireless communication processing devices 15a to 15e.

In FIG. 2, reference numeral 200 denotes a wireless communication unit as a wireless communication unit for wirelessly communicating with an external apparatus, numeral 201 denotes an unique ID for identifying the wireless communication unit 200, and 202 denotes a memory as a memory unit for storing therein a passkey when authentication of the external apparatus is carried out and authentication information of the apparatus which tried to be connected with the wireless communication processing device. Numeral 203 denotes a controller as a control unit for controlling the wireless communication unit 200 and memory 202 for control of information to be stored and for control of access to the stored information. With respect to the wireless communication unit 200, it is assumed in the following explanation that reference numeral 200a refers to a wireless communication unit of the wireless communication processing device 15a provided to the access point 10, numeral 200b refers to a wireless communication unit of the wireless communication processing device 15b provided to the home controller 11, 200c refers to a wireless communication unit of the wireless communication processing device 15c provided to the air conditioner 12, 200d refers to a wireless communication unit of the wireless communication processing device 15d provided to the microwave oven 13, and 200e refers to a wireless communication unit of the wireless communication processing device 15e, respectively. With regard to the unique ID 201, reference numeral 201a refers to a unique ID for the wireless communication processing device 15a, numeral 201b refers to a unique ID for the wireless communication processing device 15b, 201c refers to a unique ID for the wireless communication processing device 15c, 201d refers to a unique ID for the wireless communication processing device 15d, and 201e refers to a unique ID for the wireless communication processing device 15e. With respect to the memory 202, reference numeral 202a refers to a memory in the wireless communication processing device 15a, numeral 202b refers to a memory in the wireless communication processing device 15b, 202c refers to a memory in the wireless communication processing device 15c, 202d refers to a memory in the wireless communication processing device 15d, and 202e refers to a memory in the wireless communication processing device 15e. With regard to the controller 203, reference numeral 203a refers to a controller of the wireless communication processing device 15a, numeral 203b refers to a controller of the wireless communication processing device 15b, 203c refers to a controller of the wireless communication processing device 15c, 203d refers to a controller of the wireless communication processing device 15d, and 203e refers to a controller of the wireless communication processing device 15e.

FIG. 3 shows an example of information stored in the memory 202a of the wireless communication processing device 15a provided to the access point 10. Stored in the memory 202a as authentication information are information about the unique ID of the wireless communication processing device of an apparatus which tried to be connected to the wireless communication processing device 15a, e.g., the unique ID 201e of the wireless communication processing device 15e of the out-of-home apparatus 14, information indicative of finished/unfinished authentication using a passkey 31a, an authentication-failure frequency with respect to the unique ID 201e, and information indicative of acknowledge (permission) or negative-acknowledge (rejection) of the connection to the wireless communication processing devices. In the present embodiment, for the apparatus which failed 5 times in its authentication, the wireless communication processing device refuses the connection to such an apparatus. For example, when the value of the unique ID is "0-0-0-5", the apparatus ended in failure of the authentication 5 times. Thus the connection rejection is "YES", that is, the connection is rejected. As a connection request unique ID, next, the unique ID of a party subjected to a connection request by the access point 10 is stored. In this example, the unique ID 201b of "0-0-0-1" and the unique ID 201c of "0-0-0-2" are stored. It is assumed in this case that the unique ID 201a of the access point 10 is previously stored in the memories 202b, 202c and 202d. In order to start wireless communication, the passkey 31a to be used upon authentication of the connection party is also stored.

FIG. 4 shows a diagram for explaining a procedure when a wireless connection is established in the wireless network of the home, and shows an exemplary flow for explaining an exemplary procedure when a wireless connection is established between the access point 10 and air conditioner 12. The access point 10 and air conditioner 12 exchange the identical passkeys with each other for authentication and establish a reliable connection therebetween.

In FIG. 4:

(1) When the air conditioner 12 is operated by a user, first of all, the controller 203c of the wireless communication processing device 15c transmits connection request information 420 to the unique ID unit 201a of the access point 10 stored in the memory 202c (step ST400). The connection request information 420 indicates that the transmission originator asks a transmission destination to connect.

(2) Next, the controller 203a of the wireless communication processing device 15a, when receiving the above connection request information 420, returns connection acknowledge/negative-acknowledge information to the air conditioner 12 (step ST401). When the controller 203a returns connection acknowledge information 421 indicative of connection acceptance, authentication is carried out between the wireless communication processing devices 15a and 15c. Whereas, when the controller 203a returns connection negative-acknowledge information 422 indicative of connection rejection in response to the connection request information 420 received from the air conditioner 12, the connection ends in a failure (step ST406). However, in order that a new domestic appliance can be added in the home at any time, it is assumed that, when authentication ended in failure 5 times and the connection is rejected and when the access point receives the connection request information 420 from another apparatus not having the unique ID 201 stored in the memory 202a, the controller 203a of the wireless communication processing device 15a returns the connection acknowledge information 421.

(3) When the controller 203a returns the connection acknowledge information 421 indicative of connection permission and authentication is carried out between the wireless communication processing devices 15a and 15c, the controller 203c of the air conditioner 12 extracts a passkey 31c from the memory 202c (step ST402).

(4) In the wireless communication processing device 15a of the access point 10, subsequently, the controller 203a extracts the passkey 31a from the memory 202a (step ST403) and exchanges the passkey 31c with the passkey 31a (step ST404).

(5) In the wireless communication unit 200a of the wireless communication processing device 15a and in the wireless communication unit 200c of the wireless communication processing device 15c; it is judged whether or not the passkey 31c coincides with the passkey 31a (step ST405).

(6) When a coincidence between the passkeys 31c and 31a is determined, authentication is regarded as correctly done and the connection is established successfully (step ST407).

(7) The controller 203a of the wireless communication processing device 15a of the access point 10 registers the successful authentication to the unique ID unit 201c of the wireless communication processing device of the air conditioner 12 in the memory 202a (step ST408).

(8) Meanwhile, when a non-coincidence between the passkeys 31c and 31d is judged in the step ST405 in the above Item (5), the authentication is regarded as a failure and the connection is cut off (step ST409). In the case of the authentication failure, this means that unauthorized connection was tried and thus the controller 203a of the access point 10 increments the authentication-failure frequency to the unique ID unit 201c by "1" (step ST410).

In this connection, with respect to how to set the unique ID 201a and passkey 31c of the access point 10 stored in the memory 202c of the wireless communication processing device 15c of the air conditioner 12 and how to set the passkey 31a stored in the memory 202a of the wireless communication processing device 15a of the access point 10, it is considered, as an example, for the home controller 11 to set the passkey through another interface. Further, the above explanation has been made in connection with the case where the connection request is issued to the access point 10 when the air conditioner 12 is operated by the user, but the connection request may be issued when the power of the air conditioner 12 is turned ON or may be issued by another method, for example, immediately after the passkey 31c is set. Furthermore, with the above arrangement, authentication has been carried out by exchanging the passkeys 31c and 31a with each other. However, the present invention is not limited to this authentication method. It is assumed that, even when the home controller 11 or microwave oven 13 is connected to the access point 10, the same holds true similarly to the above.

FIG. 5 shows flows of an exemplary procedure when a connection to an out-of-home apparatus which ended in failure of authentication a plurality of times is rejected in order to prevent the out-of-home apparatus from making an illegal access to the wireless network in the home. The illustrated example is arranged so that domestic appliances including the access point 10 in the home will not issue a connection acknowledge to such an apparatus that ended in failure of authentication 5 times.

In FIG. 5:

(1) First of all, the wireless communication unit 200e of the out-of-home apparatus 14 transmits connection request information 420 to the access point 10 (step ST500).

(2) Next, the controller 203a of the wireless communication processing device 15a of the access point 10, when receiving the connection request information 420, returns the connection acknowledge information 421 (step ST501) and performs authenticating operation (step ST502), because the memory 202a has no such unique ID as to reject the authentication with regard to the unique ID 201e of the wireless communication processing device 15e of the out-of-home apparatus 14. However, since the out-of-home apparatus 14 does not acknowledge by the passkey 31a stored in the memory 202a, the passkey 31e of the out-of-home apparatus 14 does not coincide with the passkey 31a and thus the authentication ends in failure.

(3) When the authentication ends in failure, the controller 203a causes the first-time authentication failure for the unique ID 201e to be stored in the memory 202a (step ST503).

(4) Similarly, the operations of the connection request (step ST504), connection acknowledge (step ST505) and authentication-failure (step ST506) are repeated. And the authentication ends in failure 5 times between the wireless communication processing device 15a of the access point 10 and the wireless communication processing device 15e of the out-of-home apparatus 14 (step ST507), (5) The memory 202a of the wireless communication processing device 15a stores the unique ID 201e of the wireless communication processing device 15e as a connection negative-acknowledge unique ID therein, the controller 203a of the wireless communication processing device 15a transmits a unauthorized-apparatus unique ID 520 indicative of the unique ID 201e of the wireless communication processing device 15e to the wireless communication processing devices of the in-home appliances connected in the wireless network, that is, to the wireless communication processing device 15b of the home controller 11, the wireless communication processing device 15c of the air conditioner 12, and the wireless communication processing device 15d of the microwave oven 13 (step ST508). The unauthorized-apparatus unique ID 520 indicates the unique ID which ended in authentication failure 5 times.

(6) When the in-home appliance receives the unauthorized-apparatus unique ID 520, the unique ID 201e of the connection rejection apparatus indicative of the unauthorized-apparatus unique ID 520 is stored the memories 202b to 202d of the respective wireless communication processing devices of the home controller 11, air conditioner 12 and microwave oven 13 as the in-home appliances.

(7) The respective in-home appliances, in response to the connection request from the connection rejection unique ID unit 201e, reject the connection. Thus, when the out-of-home apparatus 14 transmits the connection request information 420 to the access point 10 (step ST509), the access point 10 returns the connection negative-acknowledge information 422 (step ST510). Even when the out-of-home apparatus 14 transmits the connection request information 420 to one of the in-home appliances (such as the home controller 11) (step ST511), the home controller 11 returns the connection negative-acknowledge information 422 (step ST512). In this conjunction, although the out-of-home apparatus 14 tried to be connected to the access point 10 in this example, the same holds true even when the out-of-home apparatus tries to be connected to another appliance.

In accordance with the aforementioned first embodiment, since the unique ID 201e of authentication-failure out-of-home apparatus 14 is informed to the appliances in the network, the unique ID 201e of the out-of-home apparatus 14 which tried to illegally access but failed in its authentication can be commonly recognized not only by the illegally-accessed appliance but also by all the appliances in the network. For this reason, the overall security of the network against unauthorized access from a cracker or an unauthorized apparatus can be increased.

Figure 6:
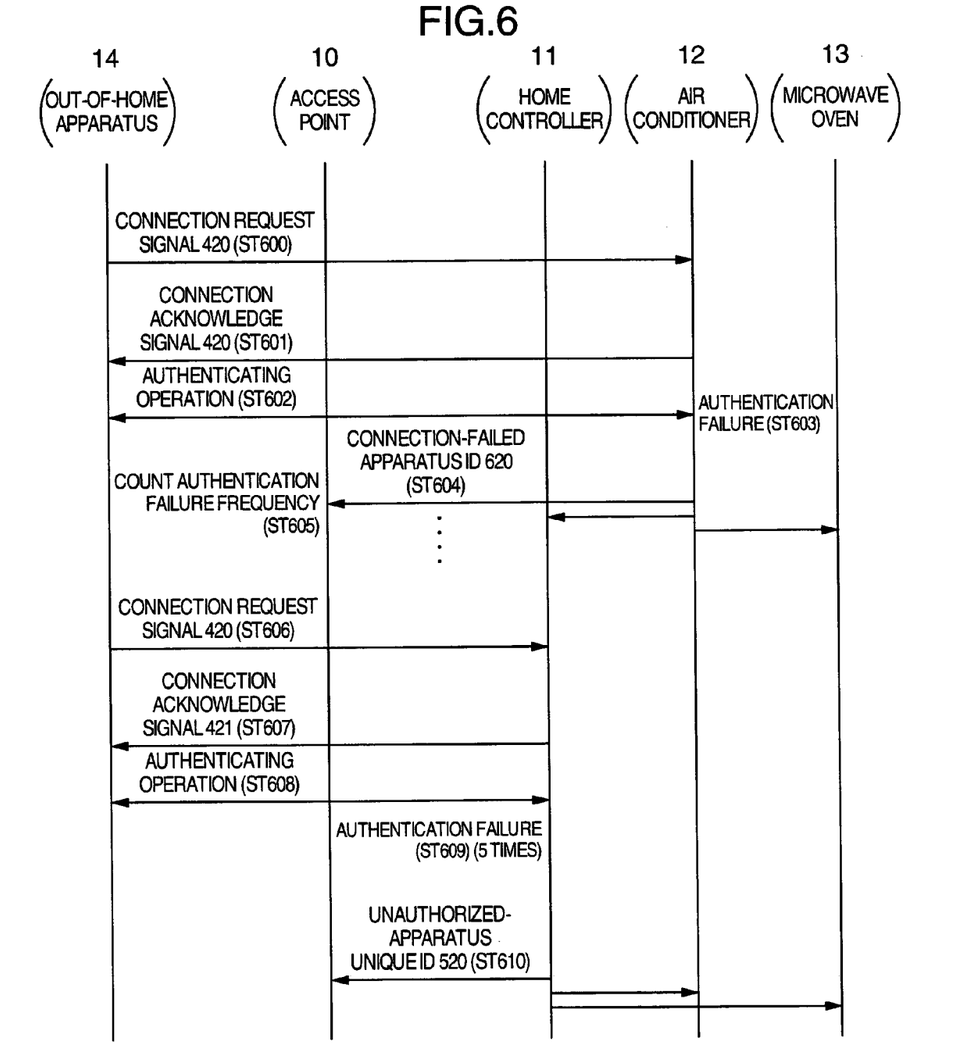
FIG. 6 is a diagram for explaining a second embodiment of the present invention.

FIG. 6 is a diagram for explaining the operation of a second embodiment of the present invention.

Like the above first embodiment, the second embodiment is also arranged, as an example, to prevent a wireless network in a home from being unauthorizedly accessed from an apparatus outside of the home. Unlike the above first embodiment wherein the frequency of access failure only to the access point 10 is counted, however, the present second embodiment is arranged so that not only the frequency of access failure to the access point 10 but also the frequency of out-of-home apparatus 14 access failure to the home controller 11, air conditioner 12 or microwave oven 13 can be grasped by the access point 10. As a result, the total frequency in the entire network, by which the out-of-home apparatus 14 failed in its authentication, can be counted, whereby an apparatus which failed in authentication, e.g., 5 times can be prevented from being connected to all the appliances in the home.

In FIG. 6:

(1) First of all, the wireless communication unit 200e of the wireless communication processing device 15e of the out-of-home apparatus 14 transmits the connection request information 420 to the air conditioner 12 (step ST600).

(2) The controller 203c of the wireless communication processing device 15c of the air conditioner 12, when receiving the connection request information 420, returns, in response to the connection request from the no-connection-rejection unique ID 201e stored in the memory 202c, the connection acknowledge information 421 (step ST601) and performs its authenticating operation (step ST602).

(3) Since the out-of-home apparatus 14 is not acknowledged by the passkey 31c stored in the memory 202 of the wireless communication processing device 15c of the air conditioner 12, the passkey 31e does not coincide with the passkey 31c and thus its authentication fails (step ST603).

(4) When the authentication fails, the controller 203c of the wireless communication processing device 15c of the air conditioner 12 transmits a authentication-failure apparatus ID 620 from the wireless communication unit 200c of the wireless communication processing device 15c to the access point 10, home controller 11 and microwave oven 13 (step ST604). The authentication-failure apparatus ID 620 is the ID of the apparatus which tried to be connected but failed in authentication, and refers to the unique ID 201e in this example.

(5) The controllers of the wireless communication processing devices of the respective appliances, when receiving the authentication-failure apparatus ID 620; that is, the controller 203a of the wireless communication processing device 15a of the access point 10, the controller 203b of the wireless communication processing device 15b of the home controller 11, and the controller 203d of the wireless communication processing device 15d of the microwave oven 13 increment their authentication-failure frequencies to the unique ID 201e by "1", and the frequencies are stored in the memory 202a of the wireless communication processing device 15a of the access point 10, the memory 202b of the wireless communication processing device 15b of the home controller 11, and the memory 202d of the wireless communication processing device 15d of the microwave oven 13 (step ST605).

(6) The out-of-home apparatus 14 issues a connection request to another in-home appliance such as the home controller 11 (step ST606), the home controller 11 issues a connection acknowledge signal (step ST607) and performs its authenticating operation (step ST608). When the home controller 11 ends in authentication failure and its authentication failure frequency reaches 5 (step ST609), the controller 203b of the wireless communication processing device 15b of the home controller 11 transmits the unauthorized-apparatus unique ID 520 to another appliance connected in the wireless network (step ST610).

(7) The controllers of the wireless communication processing devices of the appliances when receiving the unauthorized-apparatus unique ID 520, that is, the controller 203a of the wireless communication processing device 15a of the access point 10, the controller 203c of the wireless communication processing device 15c of the air conditioner 12, and the controller 203d of the wireless communication processing device 15d of the microwave oven 13 store the unique ID 201e for connection rejection in the memory 202a of the wireless communication processing device 15a, the memory 202c of the wireless communication processing device 15c, and the memory 202d of the wireless communication processing device 15d respectively. With it, in response to the connection request from the out-of-home apparatus 14, all the appliances in the home can act to reject the connection.

In accordance with the aforementioned second embodiment, since the authentication-failure unique ID 201e is commonly used by the appliances connected in the network, all the appliances in the network can recognize the unauthorized access from the out-of-home apparatus 14 which try to be connected thereto. For this reason, the system can reliably detect the access from the unauthorized apparatus, can reliably block invasion of the unauthorized apparatus into the network, and can obtain high security. The same holds true even for an unauthorized access from a cracker.

Figure 7:
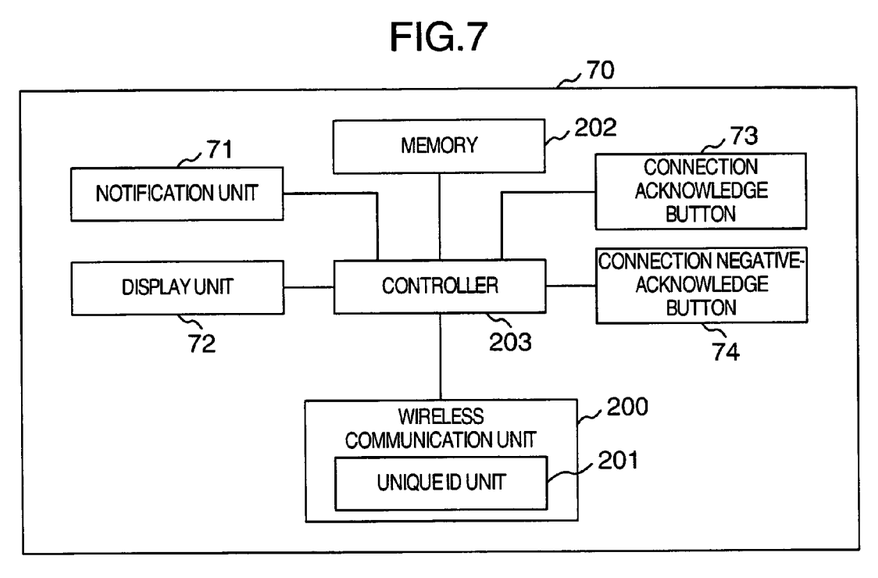
FIG. 7 shows an exemplary internal structure of a wireless communication processing device as a third embodiment of the present invention.
Figure 8:
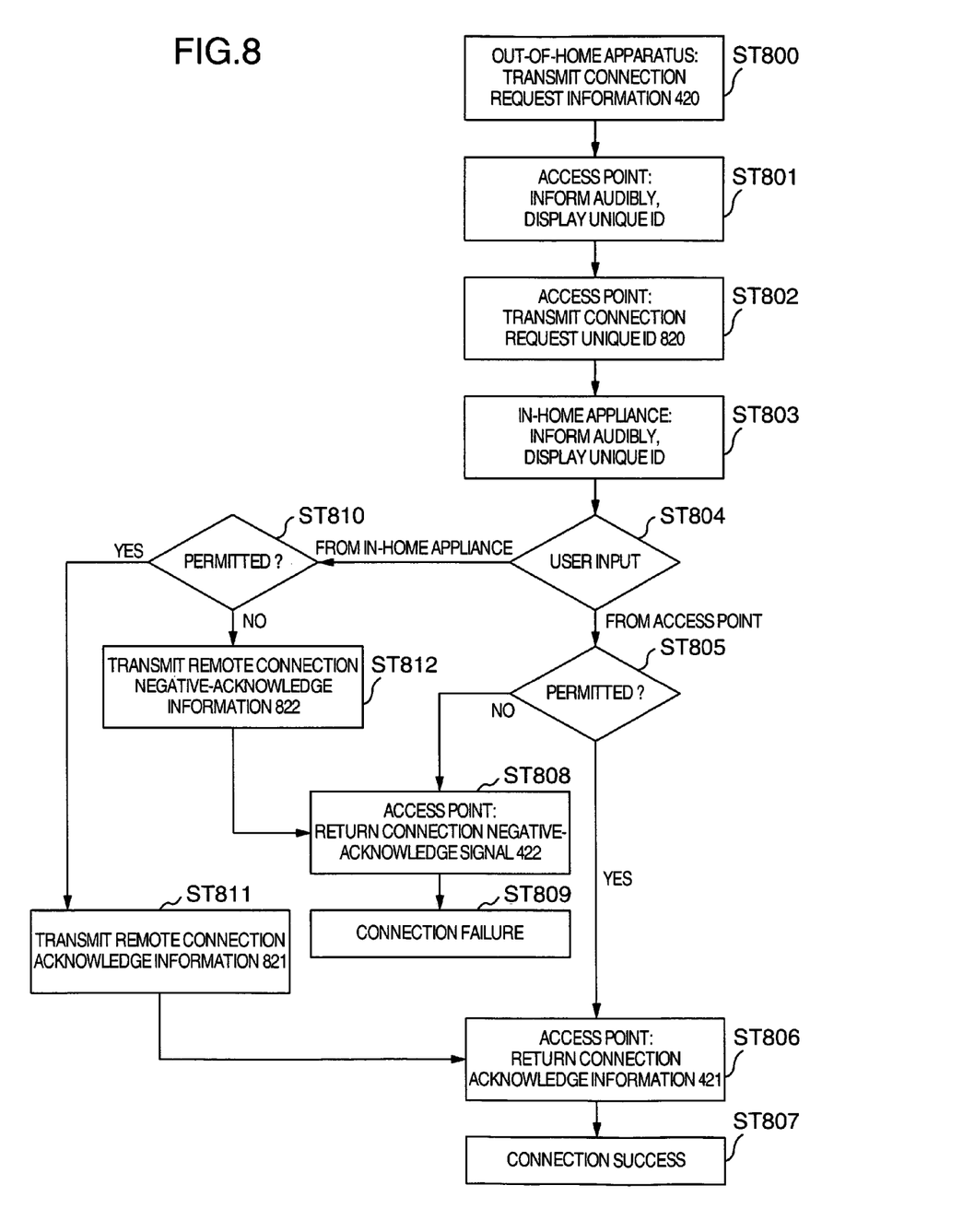
FIG. 8 is a flow chart for explaining an exemplary procedure when a wireless connection is established with use of the wireless communication processing device of FIG. 7.

FIGS. 7 and 8 are diagrams for explaining a third embodiment of the present invention.

The third embodiment is also arranged, as an example, to have such a configuration as to prevent an unauthorized access from an out-of-home apparatus in a wireless network within a home. The above second embodiment has been arranged so that, even when the appliance receives the connection request information 420 from the unique ID not stored in the memory 202a, the controller 203a automatically returns the connection acknowledge information 421. However, the third embodiment is arranged so that, an appliance receives the connection request information 420 from a unique ID not stored in the memory 202a, the appliance informs the user of the reception of the connection request from an apparatus not registered, and the user decides the acknowledge or negative acknowledge of the connection. FIG. 7 is an exemplary internal structure of a wireless communication processing device, and FIG. 8 is a flow chart for explaining an exemplary procedure when wireless connection is carried out in the wireless network.

In FIG. 7, reference numeral 70 denotes a wireless communication processing device and numeral 71 denotes a notification unit. When the notification unit 71 receives the connection request information 420 from the unique ID unit other than "authenticated" in the memory 202 and from the unique ID unit (which will be referred to as the unauthenticated unique ID (unit), hereinafter) not stored in the memory 202, the controller 203 controls the notification unit to produce a sound. Reference numeral 72 denotes a display unit. When receiving the connection request information 420 from the unauthenticated unique ID unit, the controller 203 displays the unauthenticated unique ID demanding the connection request on the display unit 72. Reference numeral 73 denotes a connection acknowledge button. When the wireless communication processing device receives the connection request information 420 from the unauthenticated unique ID unit and the connection acknowledge button is pushed, the controller 203 transmits the connection acknowledge information 421. Reference numeral 74 denotes a connection negative-acknowledge button. When the wireless communication processing device receives the connection request information 420 from the unauthenticated unique ID unit and the connection negative-acknowledge button is pushed, the controller 203 returns the connection negative-acknowledge information 422. A wireless communication processing device 70a is provided to the access point 10, a wireless communication processing device 70b is provided to the home controller 11, a wireless communication processing device 70c is provided to the air conditioner 12, a wireless communication processing device 70d is provided to the microwave oven 13, and a wireless communication processing device 70e is provided to the out-of-home apparatus 14. In the following explanation, as in the above embodiment, with regard to the wireless communication unit 200, reference numeral 200a refers to the wireless communication unit of the wireless communication processing device 70a of the access point 10, numeral 200b refers to the refers to the wireless communication unit of the wireless communication processing device 70b of the home controller 11, 200c refers to the wireless communication unit of the wireless communication processing device 70c of the air conditioner 12, 200d refers to the wireless communication unit of the wireless communication processing device 70d of the microwave oven 13, and 200e refers to the wireless communication unit of the wireless communication processing device 70e of the out-of-home apparatus 14, respectively. With regard to the unique ID unit 201, reference numeral 201a refers to the unique ID unit of the wireless communication processing device 70a, numeral 201b refers to the unique ID unit of the wireless communication processing device 70b, 201c refers to the unique ID unit of the wireless communication processing device 70c, 201d refers to the unique ID unit of the wireless communication processing device 70d, and 201e refers to the unique ID unit of the wireless communication processing device 70e. With regard to the memory 202, reference numeral 202a refers to the memory of the wireless communication processing device 70a, numeral 202b refers to the memory of the wireless communication processing device 70b, 202c refers to the memory of the wireless communication processing device 70c, 202d refers to the memory of the wireless communication processing device 70d, and 202e refers to the memory of the wireless communication processing device 70e. With regard to the controller 203, reference numeral 203a refers to the controller of the wireless communication processing device 70a, numeral 203b refers to the controller of the wireless communication processing device 70b, 203c refers to the controller of the wireless communication processing device 70c, 203d refers to the controller of the wireless communication processing device 70d, and 203e refers to the controller of the wireless communication processing device 70e.

FIG. 8 is a flow chart for explaining an exemplary procedure in a case where, when the out-of-home apparatus 14 issues a connection request to the access point 10, the wireless communication processing device 70a, which does not establish authentication with the out-of-home apparatus 14, informs the user of the connection request from the unique ID unit 201e of the wireless communication processing device 70e of the out-of-home apparatus 14, and the user selectively judges the connection acknowledge or negative acknowledge.

In FIG. 8:

(1) First of all, the wireless communication unit 200e of the wireless communication processing device 70e of the out-of-home apparatus 14 transmits the connection request information 420 to the wireless communication unit 200a of the wireless communication processing device 70a of the access point 10 (step ST800).

(2) In response to the connection request from the unique ID unit 201e of the wireless communication processing device 70e as a unauthenticated unique ID not stored in the memory 202a of the wireless communication processing device 70a as "authenticated", the controller 203a of the wireless communication processing device 70a causes the q7la to produce a sound and causes a display unit 72a to display the unique ID 201e on the display unit 72a (step ST801).

(3) The controller 203*a* transmits a connection request unique ID 820 to the wireless communication processing devices 70*b* to 70*d* in the home via the wireless communication unit 200*a* (step ST802). The connection request unique ID 820 is the unauthenticated unique ID unit which transmitted the connection request information 420, and in this example, refers to the unique ID unit 201*e*.

(4) Even in the controllers 203*b* to 203*d* of the in-home wireless communication processing devices 70*b* to 70*d* which received the connection request unique ID 820, the notification units 71*b* to 71*d* are used to produce a sound and the display units 72*b* to 72*d* are used to display the memory 202*e* thereon, like the controller 203*a* of the access point 10.

(5) Input operation is carried out from the access point 10 or wireless communication processing device 70*a* to 70*d* (step ST804).

(6) The wireless communication processing device 70*a* of the access point 10 is first used to input a connection permission or rejection (step ST805).

(7) When the user pushes a connection acknowledge button 73*a*, the controller 203*a* returns the connection acknowledge information 421 to the out-of-home apparatus 14 (step ST806), establishing a successful connection (step ST807).

(8) When the user pushes a connection negative-acknowledge button 74*a* in the step ST805 in the above Item (6), the controller 203*a* returns the connection negative-acknowledge information 422 to the out-of-home apparatus 14 (step ST808), ending in a connection failure (step ST809).

(9) Explanation will next be made as to user's input operation with use of the in-home appliance. For example, the user enters a connection permission or rejection with use of a connection acknowledge button 73*d* of the wireless communication processing device 70*d* provided to the microwave oven 13 (step ST810).

(10) Pushing of the connection acknowledge button 73*d* causes the controller 203*d* of the wireless communication processing device 70*d* of the access point 10 to transmit remote connection acknowledge information 821 to the wireless communication processing device 70*a* via the wireless communication unit 200*d* (step ST811). The remote connection acknowledge information 821 indicates the connection permission to the connection request from the connection request unique ID 820.

(11) When the wireless communication unit 200*a* of the wireless communication processing device 70*a* of the access point 10 receives the remote connection acknowledge information 821, the controller 203*a* returns the connection acknowledge information 421 to the out-of-home apparatus 14 (step ST806), establishing a successful connection (step ST807).

(12) When the user pushes a connection negative-acknowledge button 74*d* of the wireless communication processing device 70*d* provided to the microwave oven 13 in the step ST810 in the above Item (9), the controller 203*d* transmits remote connection negative-acknowledge information 822 to the wireless communication unit 200*a* of the wireless communication processing device 70*a* of the access point 10 via the wireless communication unit 200*d* (step ST812). The remote connection negative-acknowledge information 822 is information indicative of the connection rejection to the connection request from the connection request unique ID 820.

(13) When the wireless communication unit 200*a* of the wireless communication processing device 70*a* of the access point 10 receives the remote connection negative-acknowledge information 822, the controller 203*a* returns the connection negative-acknowledge information 422 to the out-of-home apparatus 14 (step ST808), ending in connection failure (step ST809).

Although notification of reception of the connection request from the unauthenticated unique ID has been done by producing a sound and by displaying the unique ID on the display unit in the aforementioned third embodiment, it is also possible, when the authentication with an external apparatus ended in failure, to inform the user of it to warm him of the presence of an access of the unauthorized apparatus to the access point 10. Further, it is considered to display the presence of a connection request from the unauthenticated apparatus with use of an LDE or the like.

In accordance with the third embodiment, the connection request from the unauthenticated apparatus is informed to the user audibly and by displaying the unique ID on the display unit and the connection permission or rejection is determined by the user. Therefore, any access from an unauthorized-apparatus can be prevented, high security can be obtained, the connection permission or rejection can be arbitrarily selected, and a wide range of wireless communication processing operation with an apparatus can be realized. Even an unauthorized access from a cracker can be similarly avoided.

The inventions as the foregoing embodiments include (1) to (4) which follow.

(1) A wireless communication processing system for performing wireless communication processing operation between a plurality of apparatuses, which includes a first wireless communication processing device provided to first one of the plurality of apparatuses and having a first unique ID as its own unique ID and a second wireless communication processing device provided to second one of the plurality of apparatuses and having a second unique ID as its own unique ID, wherein, in response to a connection request sent from a third wireless communication processing device provided to an apparatus other than the plurality of apparatuses to the first wireless communication processing device, the first wireless communication processing device acknowledges the connection, and when ending in authentication failure, transmits a third unique ID as the unique ID of the third wireless communication processing device to the second wireless communication processing device as a authentication-failure unique ID or unauthorized-apparatus unique ID.

(2) A wireless communication processing system for performing wireless communication processing operation between a plurality of apparatuses, which includes a first wireless communication processing device provided to first one of the plurality of apparatuses and having a first unique ID as its own unique ID and a second wireless communication processing device provided to second one of the plurality of apparatuses and having a second unique ID as its own unique ID, wherein, when a connection request is issued from a third wireless communication processing device provided to an apparatus other than the plurality of apparatuses to the first wireless communication processing device, the first wireless communication processing device transmits a third unique ID as the unique ID of the third wireless communication processing device to the second wireless communication processing device as a connection request unique ID.

(3) A wireless communication processing system for performing wireless communication processing operation between a plurality of apparatuses, which includes a wireless communication unit provided to the plurality of apparatuses and capable of transmitting and receiving unique ID's, a memory unit controllably for storing the received unique ID and an authenticating passkey therein, and a control unit, when the wireless communication unit receives connection request information from the apparatus other than the plurality of apparatuses, for transmitting the unique ID of the apparatus other than the plurality of apparatuses to other ones of the plurality of apparatuses as a connection request unique ID, and when receiving the transmitted connection request unique ID, for displaying the presence of the connection request or informing thereof, and transmitting connection permission or rejection information to the apparatus other than the plurality of apparatuses.

(4) A control unit in a wireless communication processing device is arranged so that, when receiving the unique ID of a connection request apparatus other than the plurality of apparatuses from any of wireless communication processing devices of the plurality of apparatuses as an authentication-failure unique ID, a frequency of authentication failure larger by "1" than a frequency of authentication-failure of the first wireless communication processing device with the apparatus other than the plurality of apparatuses is stored in a memory unit.

In accordance with the present invention, high security can be obtained and unauthorized access can be prevented.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A wireless communication processing system for performing wireless communication processing operation between a plurality of apparatuses, comprising:
   a first wireless communication processing device provided to first one of said plurality of apparatuses and having a first unique ID; and
   a second wireless communication processing device provided to second one of said plurality of apparatuses and having a second unique ID,
   wherein, in response to a connection request issued from a third wireless communication processing device provided to an apparatus other than said plurality of apparatuses to said first wireless communication processing device, the first wireless communication processing device issues a connection permission, but when ending in authentication failure, the first wireless communication processing device transmits the unique ID of the third wireless communication processing device as a third unique ID to said second wireless communication processing device as an authentication-failure or unauthorized-apparatus unique ID, the second wireless communication processing device receives the third unique ID and, when receiving a connection request from said third wireless communication processing device, the second wireless communication processing device rejects the connection.

2. A wireless communication processing system for performing wireless communication processing operation between a plurality of apparatuses, comprising:
   a first wireless communication processing device provided to first one of said plurality of apparatuses and having a first unique ID; and
   a second wireless communication processing device provided to second one of said plurality of apparatuses and having a second unique ID,
   wherein, when a connection request is issued from a third wireless communication processing device provided to an apparatus other than said plurality of apparatuses to said first wireless communication processing device, the first wireless communication processing device transmits the unique ID of the third wireless communication processing device as a third unique ID to said second wireless communication processing device as a connection request unique ID, the second wireless communication processing device receives the third unique ID, displays presence of the connection request from said third wireless communication processing device or informs thereof, and transmits connection permission or rejection information to said first wireless communication processing device, the first wireless communication processing device receives the connection permission or rejection information and transmits the information to said third wireless communication processing device.

3. A wireless communication processing device for performing wireless communication processing operation between a plurality of apparatuses, comprising:
   wireless communication means provided to said plurality of apparatuses and capable of transmitting and receiving unique ID's;
   memory means for storing a received unique ID and an authenticating passkey therein;
   control means controllably for issuing a connection permission on the basis of connection request information from an apparatus other than said plurality of apparatuses received at said wireless communication means and, when ending in authentication failure, for, transmitting the unique ID of the apparatus other than the plurality of apparatuses to other ones of said plurality of apparatuses as an authentication-failure or unauthorized-apparatus unique ID.

4. The wireless communication processing device as set forth in claim 3, wherein said control means controllably stores a frequency of authentication failure in said memory means and, when said frequency of authentication failure reaches a predetermined value, transmits the unique ID of the apparatus other than said plurality of apparatuses to other ones of said plurality of apparatuses as a authentication-failure or unauthorized-apparatus unique ID.

5. A wireless communication processing device for performing wireless communication processing operation between a plurality of apparatuses, comprising:
   wireless communication means provided to said plurality of apparatuses and capable of transmitting and receiving unique ID's;
   memory means for storing a received unique ID and authenticating passkey therein; and
   control means controllably for issuing a connection permission on the basis of connection request information other than an apparatus other than said plurality of apparatuses received at said wireless communication means and, when ending in authentication failure, for transmitting the unique ID of the apparatus other than the plurality of apparatuses to other ones of said plurality of apparatuses as an authentication-failure or unauthorized-apparatus unique ID and, when receiving the transmitted unique ID, for rejecting the connection from the apparatus other than the plurality of apparatuses.

6. A wireless communication processing device for performing wireless communication processing operation between a plurality of apparatuses, comprising:

wireless communication means provided to said plurality of apparatuses and capable of transmitting and receiving unique ID's;

memory means for storing a received unique ID and an authenticating passkey therein; and control means controllably for issuing a connection permission on the basis of connection request information from the apparatus other than said plurality of apparatuses received at said wireless communication means and, when ending in successful authentication, for storing the unique ID of the apparatus other than the plurality of apparatuses to said memory means as a connection permission unique Id.

7. A wireless communication processing method for performing wireless communication processing operation between a plurality of apparatuses, comprising the steps of:

storing a received unique ID and an authenticating passkey;

issuing a connection permission on the basis of connection request information from an apparatus other than said plurality of apparatuses;

when the connection permission is issued and authentication ends in failure, transmitting the unique ID of the apparatus other than said plurality of apparatuses to other ones of said plurality of apparatuses as an authentication-failure or unauthorized-apparatus unique ID; and receiving said transmitted unique ID and rejecting the connection from the apparatus other than said plurality of apparatuses.

8. A wireless communication processing method for performing wireless communication processing operation, comprising the steps of:

storing a received unique ID and an authenticating passkey therein;

receiving connection request information from an apparatus other than said plurality of apparatuses and transmitting the unique ID of the apparatus other than the plurality of apparatuses to other ones of said plurality of apparatuses as a connection request unique ID; and receiving the transmitted connection request unique ID, displaying presence of the connection request or informing thereof, and transmitting connection permission or rejection information to the apparatus other than said plurality of apparatuses.

* * * * *